M. FREUD.
SUPPORTING ARM FOR DISPLAY CASES.
APPLICATION FILED DEC. 28, 1909.
1,041,264.
Patented Oct. 15, 1912.
Fig. 1.
Fig. 2.
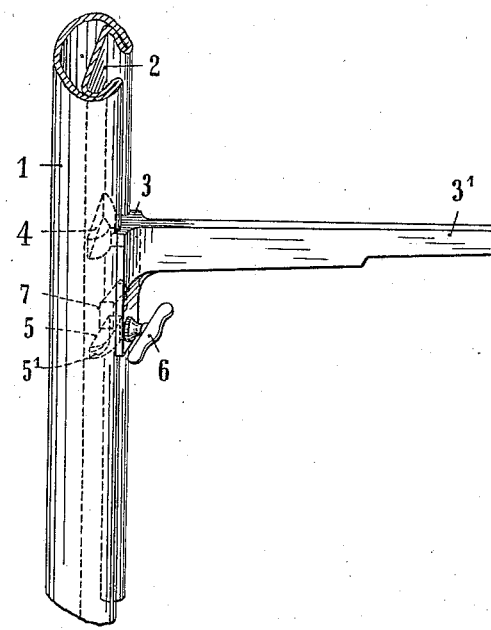
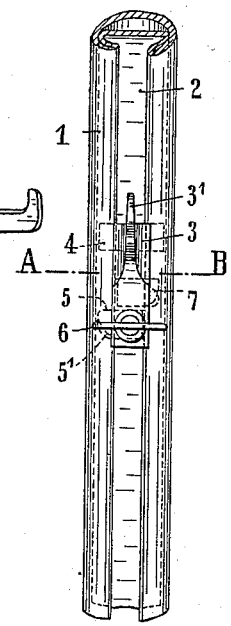
Fig. 3.
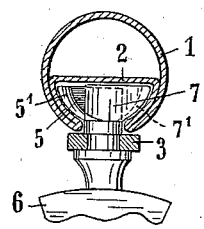
Fig. 4.
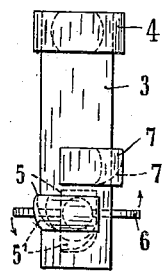
Witnesses
W. H. Bevigan
John N. Howing
Inventor.
MAURICE FREUD.
by J. Van Desenneil
Attorney.
COLUMBIA PLANOGRAPH CO., WASHINGTON, D. C.

UNITED STATES PATENT OFFICE.

MAURICE FREUD, OF BERLIN, GERMANY.

SUPPORTING-ARM FOR DISPLAY-CASES.

1,041,264.      Specification of Letters Patent.      Patented Oct. 15, 1912.

Application filed December 28, 1909. Serial No. 535,344.

*To all whom it may concern:*

Be it known that I, MAURICE FREUD, manufacturer, and subject of the Kingdom of Roumania, residing at Berlin, in the Kingdom of Prussia, German Empire, have invented a new and useful Improvement in Supporting-Arms for Display-Cases; and I do hereby declare the following to be a full, clear, and exact description of the same.

The present invention relates to improvements in the supporting arms for display cases for shop windows and the like. These adjustable arms are provided with slotted supports, and the improvement is intended to prevent the turning too far of the retaining head which presses with a cam face against the edges of the slot, and thus to prevent any accidental release of the connection between the upright and the supporting arm, further it prevents any further tightening of the securing head in the case of a sudden blow or pressure or great weight placed upon the supporting arm.

The object is attained by forming the rotatable retaining head with a curved surface upon one side only and causing it to encounter with a predetermined amount of turning a fixed stop placed upon the upright, which stop is provided with a surface curved in the opposite direction, so that on the one hand the turning of the securing head is limited, and on the other hand in case the securing head in the event of a sudden loading of the arm should turn further until it encounters the projection, then its curved surface, as well as that of the fixed projection, will apply itself firmly against the sides of the slot.

The accompanying drawing illustrates the invention as follows: Figure 1 is a perspective side view of the device. Fig. 2 shows a front elevation of the same. Fig. 3 shows a horizontal section through the support illustrating the parts now in question. Fig. 4 shows in separate view the securing head with its projection.

The securing of the arm 3 3' is effected in the manner previously set forth by means of fixed and movable securing heads 4, 5, on the base 3 of said arm and which are placed in the dovetailed groove 2 of the support 1, and are secured as shown. The method of the securing according to the present invention differs from that of the devices previously known in that the securing head 5, which can be turned by means of the handle pieces 6 in the support 3, is provided with a curved surface 5' on one side only, and above it the part 7 placed on the support 3 limits its motion. The fixed part 7 is provided on the side opposite to that of the rotatable head 5 with a helically curved surface 7'. If, after the insertion of the securing heads 4, 5 in the groove 2 of the support 1, it is desired to fasten the arm 3' and the base 3, then the wing bolt 6 is turned into the transverse position. The effect of this is that toward the end of the quarter turn, the surfaces 5' and 7' of the rotatable retaining piece 5 and of the fixed stop 7 press with increasing pressure against the sides of the groove. If hereupon a sudden jerk is given to the supporting arm 3', or this arm is suddenly heavily weighted, then the rotatable head 5 has the tendency to turn itself downward. This arrangement has the advantage that the rotatable head presses with still greater pressure against the side of the slot and the opposite rising surface 7' of the fixed stop 7 also presses with increasing pressure against the side of the slot, so that any accidental release of the connection by the cessation of the frictional pressure is prevented.

Having now particularly described and ascertained the nature of my said invention and in what manner the same is to be performed, I declare that what I claim is:

1. In supports for show frames, the combination with a grooved upright and an arm having a base, of a rotatable securing head on said base, and provided at one side only with a helical cam surface, and a fixed projection also on said base, and provided with a helical face curved in the opposite direction.

2. In supports for show frames, the combination with an upright having a dovetail groove and a supporting arm having a base, of a fixed head on the upper part of said base and engaging under both walls of said groove, a rotatable head on the lower part of said base and having a helically curved cam face at one side only and adapted to engage under one wall of the groove, a fixed part on said base just above said rotatable head and having a curved face engaging under the opposite wall from the one engaged by the rotatable head, and a manipulating means for the rotatable head.

In testimony whereof, I have signed my name to this specification in the presence of two subscribing witnesses.

MAURICE FREUD.

Witnesses:
WOLDEMAR HAUPT,
HENRY HASPER.

Copies of this patent may be obtained for five cents each, by addressing the "Commissioner of Patents, Washington, D. C."